United States Patent [19]

Sherman et al.

[11] 4,403,974

[45] Sep. 13, 1983

[54] POSITION CONTROL MECHANISM FOR A VARIABLE DRIVE RATIO PULLEY SYSTEM

[75] Inventors: James F. Sherman, Brighton; William J. Vukovich, Ypsilanti, both of Mich.

[73] Assignee: General Motors Corporation, Detroit, Mich.

[21] Appl. No.: 204,955

[22] Filed: Nov. 7, 1980

[51] Int. Cl.³ .................. F16H 11/06; F16H 11/04
[52] U.S. Cl. .................................. 474/11; 474/17; 474/18; 474/28
[58] Field of Search .................. 474/18, 28, 11, 12, 474/17, 22; 74/867, 860, 878

[56] References Cited

U.S. PATENT DOCUMENTS

| | | | |
|---|---|---|---|
| 3,110,189 | 11/1963 | Stever | 474/18 |
| 3,200,666 | 8/1965 | Schrodt et al. | 474/18 |
| 3,451,283 | 6/1969 | Rattunde | 474/18 |
| 3,596,528 | 8/1971 | Dittrich et al. | 474/12 |
| 3,699,827 | 11/1972 | Vogel | 474/18 |

FOREIGN PATENT DOCUMENTS

| | | | |
|---|---|---|---|
| 1162207 | 1/1964 | Fed. Rep. of Germany | 474/12 |
| 1210648 | 2/1964 | Fed. Rep. of Germany | 474/28 |
| 1455865 | 6/1969 | Fed. Rep. of Germany | 474/28 |
| 1229278 | 7/1959 | France | 474/28 |
| 1293574 | 4/1961 | France | 474/28 |
| 7804737 | 5/1978 | Netherlands | 474/28 |
| 7811192 | 11/1978 | Netherlands | 474/28 |

Primary Examiner—Leslie A. Braun
Assistant Examiner—L. D. Shannon, III
Attorney, Agent, or Firm—Donald F. Scherer

[57] ABSTRACT

A variable drive ratio pulley system has longitudinally adjustable pulley halves operated by fluid pressure which acts on piston and cylinder structures operatively connected with the adjustable pulley halves. The fluid pressure in one of the piston and cylinder structures is controlled by a valve spool responsive to an actuator on which a lever member is pivotally disposed and maintained in abutment with the drive surface on the adjustable pulley half. The lever member also abuts a control rod which is linearly movable in response to command signals. Linear movement of the control rod initiates pivoting of the lever member and enforces or permits resultant linear movement of the actuator so that the spool valve is operated to change the pressure level operating on the piston thereby permitting movement of the pulley half resulting in a change of the drive ratio. The pulley also enforces pivoting of the lever and attendant linear movement of the actuator which causes the spool valve to return to its neutral position when the pulley half has attained the position demanded by the control rod.

2 Claims, 1 Drawing Figure

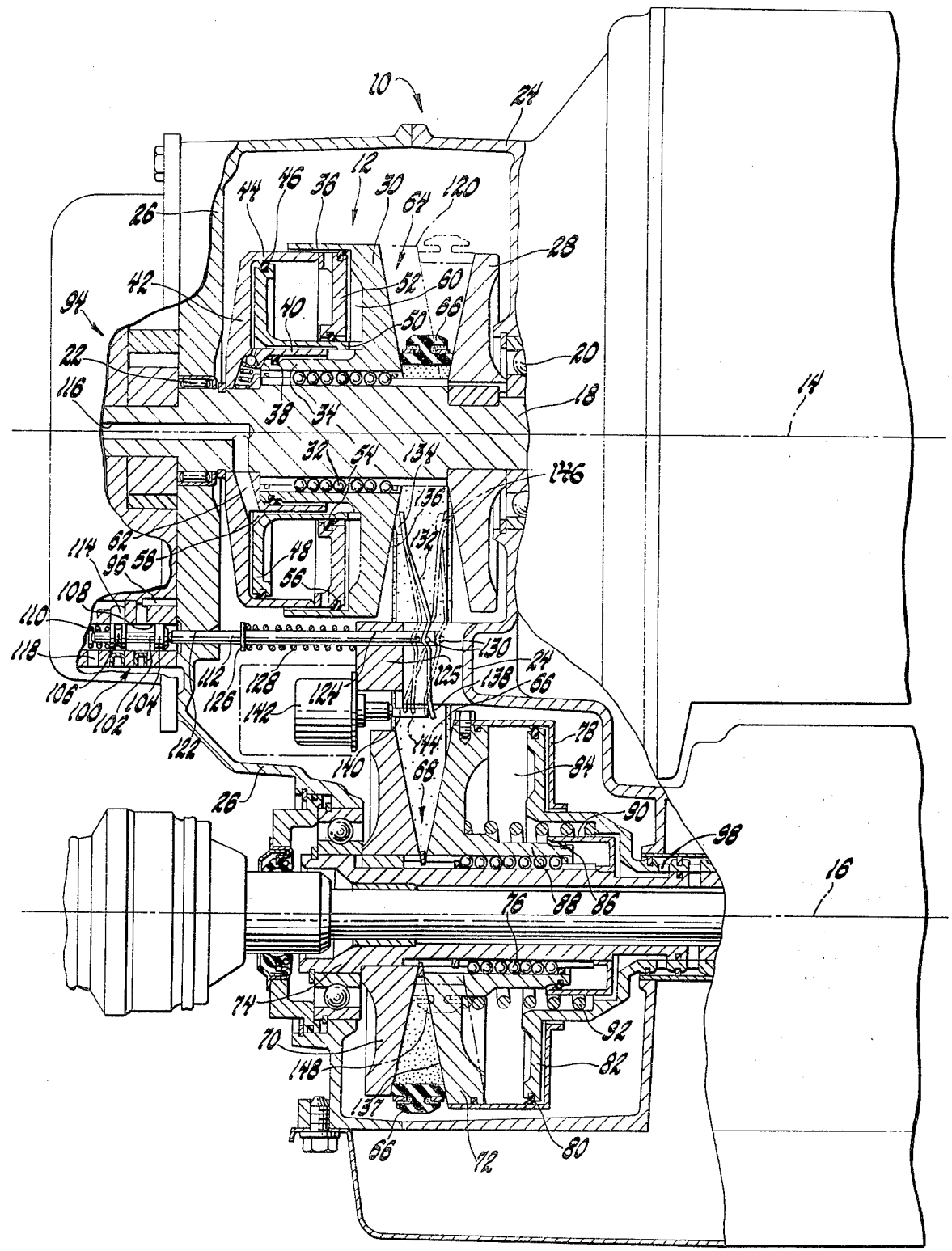

POSITION CONTROL MECHANISM FOR A VARIABLE DRIVE RATIO PULLEY SYSTEM

This invention relates to control mechanisms for variable ratio pulley drives and more particularly to mechanical feedback mechanisms for controlling the drive ratio within such mechanisms.

It has generally been the practice in position control mechanisms used with variable ratio pulley drive structures to control the pulley position through a variable hydraulic pressure which is established by various drive parameters. In such systems the drive ratio is proportional to the control pressure.

The present invention uses a mechanical linkage including a lever which is pivotally mounted on a linearly movable actuator rod. The actuator rod controls the operation of a valve member which in turn controls the pressure which controls the position of one half of one drive pulley during ratio change while the other drive pulley has a control pressure which is independent of the valve spool operation. The lever member is responsive to a linear displacement control mechanism and the position of a portion of the drive pulley.

The linear displacement control mechanism is operable on one end of the lever to control the position thereof in response to the desired drive ratio. Movement of this end of the lever member results in pivoting about the other end so that linear movement of the actuator rod and therefore operation of the valve spool occurs. The movement of the valve spool results in a change in the operating pressure level so that the pulley member is moved linearly to effect a change in the drive ratio. Movement of the pulley member results in pivoting of the lever member about the one end thereof so that the actuator rod is again moved linearly opposite to the previous movement until the valve spool returns to its neutral location after the desired drive ratio has been obtained.

It is an object of this invention to provide an improved position control mechanism for a variable ratio pulley drive mechanism having a linearly movable portion wherein a pivotally disposed lever is responsive to the ratio within the pulley system and to a linear control member to operate a valve mechanism to control the pressure level within the linear movable portion to establish the ratio desired by the linear control mechanism.

It is another object of this invention to provide an improved position control mechanism for a variable ratio drive pulley system wherein each pulley has a linearly movable portion and wherein one of the pulley portions is movable in response to control pressure which is established by a valve spool responsive to a linear actuator rod which is positioned by a lever member controlled in response to an input control function and the axial position of the pulley.

These and other objects and advantages of the present invention will be more apparent from the following description and drawing which is a cross-sectional elevational view of a portion of a transmission incorporating the present invention.

Referring to the drawing, there is shown a variable pulley drive ratio transmission, generally designated 10, which incorporates a variable drive ratio pulley mechanism, generally designated 12. The transmission 10 has an input axis 14 and an output axis 16. The input axis 14 is substantially coaxial with an engine crankshaft, not shown. The output axis 16 is substantially coaxial with the vehichle drive axles, not shown.

An input shaft 18 is rotatably supported in bearings 20 and 22 disposed in transmission housing 24 and 26, respectively. The input shaft 18 is coaxial with the input axis 14 and has drivingly connected thereto a pair of pulley halves 28 and 30. The pulley half 28 is maintained stationary in a longitudinal direction relative to the input shaft 18 while the pulley half 30 is permitted to move longitudinally relative to the input shaft 18. Both pulley halves 28 and 30 rotate in unison with the input shaft 18 which is adapted to be either driven directly by the engine crankshaft or through an intervening friction clutch or fluid drive mechanism, not shown. Any of the well-known friction clutch mechanisms, either manually or automatically engaged, or fluid drive mechanisms can be utilized.

The pulley half 30 is drivingly connected through a ball spline 32 and has formed integrally therewith an inner hub 34 and an outer hub 36. The inner hub 34 carries a seal member 38 which sealingly engages an inner cylinder portion 40 formed integrally with a cylinder housing 42. The cylinder housing 42 also includes an outer cylinder portion 44 which is sealingly engaged by a lip seal 46 secured in a longitudinally movable piston member 48. The piston member 48 has a hollow cylindrical portion 50 which abuts the pulley half 30.

An annular dividing member 52 has fixed thereto a pair of lip seals 54 and 56 which sealingly engage cylindrical member 50 and hub 36, respectively. The divider member 52 abuts outer cylinder portion 44 and is secured on input shaft 18 such that longitudinal movement thereon cannot occur. The piston 48 and cylinder housing 42 cooperate to form a pressure chamber 58 and the divider member 52 and pulley half 30 cooperate to form a pressure chamber 60. The piston 48 and pulley half 30 are operable to move in unison longitudinally relative to the input shaft 18 in response to fluid pressure within the chambers 58 and 60. These chambers 58 and 60 are interconnected through a fluid passage 62 and the space between cylinder portion 40 and cylindrical portion 50.

The pulley halves 28 and 30 cooperate to form a drive pulley or sheave, generally designated 64, which is operatively connected to a drive belt 66. The drive belt 66 is also connected to a driven pulley or sheave, generally designated 68, comprised of a stationary pulley half 70 and a longitudinally movable pulley half 72. The stationary pulley half 70 is drivingly connected directly to a sleeve shaft 74 while the pulley half 72 is drivingly connected through a ball spline 76 to the sleeve shaft 74. The sleeve shaft 74 is adapted to be connected to a planetary gearing mechanism such as that shown in U.S. Ser. No. 161,159 filed June 19, 1980, now abandoned, and assigned to the assignee of the present invention. This patent application also discloses a variable pulley drive mechanism which can incorporate the present control mechanism described herein.

The movable pulley half 72 has secured thereto a housing 78 which is sealingly engaged by a lip seal 80 disposed in a stationary wall 82. The stationary wall 82 cooperates with the housing 78 and movable pulley half 72 to form a pressure chamber 84. The inner portion of pressure chamber 84 is sealed by a lip seal 86 which is disposed in a hub 88 on pulley half 72 and sealingly engages a housing 90 secured to the sleeve shaft 74. A compression spring 92 is disposed in the pressure chamber 84 and is operatively connected between the pulley half 72 and the stationary wall member 82. The spring 92 urges the pulley half 72 leftward toward the maximum underdrive ratio shown. It will also be appreciated that fluid pressure within the chamber 84 urges the pulley half 72 to the left.

The input shaft 18 is also drivingly connected to a positive displacement pump, generally designated 94. The pump 94 may be of any of the well-known designs for transmission control pumps and is preferably of the variable displacement type, such that maximum efficiency can be obtained. As is well-known, such fluid pumps provide positive fluid pressure for transmission control systems wherein the fluid pressure can be controlled to be proportional to engine torque and engine speed or vehicle speed. The pump 94 is connected to a pressure control system of conventional design, not shown, which in turn directs system pressure to a passage 96 and a passage 98. The control system, as is well-known, will provide a system pressure proportional to the vehicle or engine operating parameters. Passage 98 is connected between stationary wall 82 and housing 90 through chamber 84. The passage 96 is in fluid communication with a valve mechanism, generally designated 100.

The valve mechanism 100 includes a valve spool 102 having a pair of equal diameter lands 104 and 106 slidably disposed in a valve bore 108. The valve spool 102 is urged to the right by a spring member 110 into abutment with an actuator rod 112. The valve land 106 registers in a position shown with a fluid port 114 connected with a passage 116 which in turn is connected to the passage 62. As previously mentioned, the passage 62 is in fluid communication with pressure chambers 58 and 60. The space containing the spring 110 and therefore the left side of land 106, is connected to an exhaust port 118 while the space between valve lands 106 and 104 is in fluid communication with the system pressure in passage 96. The valve land 106 is designed to provide either line-to-line sealing of port 114 or slight underlapping of the port. It is preferable that slight underlapping should be achieved.

With this structure, the pressure in port 114 and therefore passages 116 and 62 is less than system pressure when the valve spool 102 is in the position shown. If the valve spool 102 is moved to the left, the pressure in port 114 will be equal to system pressure, while if the valve spool 102 is moved to the right the pressure in port 114 will be equal to exhaust pressure. Thus, the pressure in chambers 58 and 60 can be controlled by the movement of valve spool 102 between full system pressure and exhaust pressure. The pressure within chamber 84 of pulley 68, however, is always maintained equal to system pressure and thus establishes the primary tension force in the belt 66. It is therefore evident that if the force on pulley 30 is greater than the force on pulley 72, the pulley 30 will move to the right toward the phantom position shown at 120 which is the maximum overdrive position for the variable drive mechanism 12. Movement of pulley 30, due to drive belt 66, results in movement of pulley 72. If the force on pulley 72 is greater than the force on pulley 30, the pulley 72 will move toward the position shown and the belt 66 will cause the pulley 30 to respond to such movement by moving leftward. Since the maximum pressure available is equal to system pressure, it is evident that the pressure chambers operable on pulley 30 must be greater than the area of the pressure chamber operable on the pulley half 72. In order to conserve maximum envelope size, pulley half 30 utilizes a double chamber arrangement such that the wall of pulley half 30 is effectively a pressure piston. However, a single area chamber can also be used if the space is available.

The actuator rod 112 is slidably disposed in apertures 122 and 124, formed in housing 26 and block 125, respectively. A shoulder 126 is formed on the actuator rod 112 and a spring member 128 is compressed between the shoulder 126 and housing 24. This spring 128 urges the actuator rod 112 to the left and has a force stored therein which is greater than the force obtainable in spring 110.

The actuator rod 112 has secured therein a pin 130 on which is pivotally disposed a lever 132. The lever 132 has an end 134 in abutment with the conical surface 136 of pulley half 30 and an end 138 in abutment with a rod 140 which is the output member for a control mechanism 142. The control mechanism 142 is a conventional linear actuator which provides an output member which moves linearly in response to an input control signal. The control signal can be, as is well-known, proportional to any of the various vehicle or engine operating parameters such as engine torque, operator demand, vehicle speed and engine speed.

As mentioned above, the variable pulley drive mechanism 12 is shown in the maximum underdrive ratio. That is, the speed is reduced as it is transmitted from pulley 64 to pulley 68 through belt 66 while torque is increased. Should the operating conditions of the vehicle indicate that the drive ratio should be changed to provide a higher output speed relative to input speed, the control rod 140 will move leftward toward the phantom position 144, shown for the lever 132. Since the spring 128 has a higher force stored therein than spring 110, the valve spool 102 will be moved leftward such that system pressure will be directed through port 114, passage 116 and passage 62 in pressure chambers 58 and 60. The pressure in chambers 58 and 60 will result in rightward movement of piston 48 and pulley half 30, such that the belt will move outward on the conical surfaces of pulley 64 thereby forcing the belt 66 inward on the conical surfaces of pulley 68. The rightward movement of pulley 30 will continue until end 134 of lever 132 is pivoted sufficiently such that the actuator rod 112 is moved to the neutral position and the valve spool 102 has returned to the neutral position shown. Any drive ratio determined by the position of the lever between the solid and phantom positions can be maintained. The pivoting of lever 132 about end 138 retracts the actuator rod 112 from the valve spool 102 such that the spring 110 is about to position the valve spool 102 in the neutral position.

If the drive mechanism 12 is in a drive ratio other than maximum underdrive, such as maximum overdrive as shown in phantom position, and the control 142 is operable to request a lower drive ratio, the control rod 140 will be moved to the right toward the position shown in solid lines such that the lever 132 will pivot about the end 134 shown in phantom at 146. This pivoting of lever 132 will result in movement of the actuator rod 112 to the right such that the spring 110 will be able to move the valve spool 102 to the right. This movement will provide an exhaust connection for port 114 such that the fluid pressure in chambers 58 and 60 will be connected to exhaust. When this occurs, the fluid pressure in chamber 84, in cooperation with spring 92, will be able to move the drive belt 66 from the phantom position shown at 148 toward the solid position resulting in leftward movement of pulley half 30. The leftward movement of pulley half 30 will result in pivoting of the lever 132 about end 138 such that the spring 128 will then move the actuator rod 112 to the left. This leftward movement will continue until the valve spool 102 has returned to the neutral position and sufficient pressure is generated in chambers 58 and 60 to maintain the required force on pulley 30 so that the desired drive ratio will be maintained.

It should be obvious from the above, that the drive ratio between pulleys 64 and 68 can be controlled infinitely, within the drive range permitted, between the maximum underdrive position and the maximum overdrive position.

The embodiments of the invention in which an exclusive property or privilege is claimed are defined as follows:

1. A position control mechanism for a variable drive mechanism having a sheave with an axially stationary member and an axially movable member, said axially movable member having a fluid pressure operated portion; said position control mechanism comprising: a source of fluid pressure; valve means operatively connected to said source of fluid pressure for controlling the delivery of fluid pressure to said fluid pressure operated portion; reciprocable actuator means for controlling said valve means; resilient means for continuously urging said actuator means in one direction into abutment with said valve means; lever means having spaced ends and connecting means intermediate the ends for operatively connecting said lever means with said actuator means; one of said ends being maintained in contact with said axially movable member by said resilient means; and control means operatively maintained in abutment with the other end of said lever means by said resilient means, said control means being operable to pivot said lever means about said one end when a change in the variable drive mechanism in one direction is desired so that said actuator means will be moved by movable connecting means to permit said valve means to direct fluid pressure to cause a change in the axial position of said axially movable member resulting in pivoting of the lever means about said other end which will permit said resilient means to move the actuator means to discontinue operation of said valve means when the position of the axial movable member desired by the control means is achieved.

2. A position control mechanism for a variable drive mechanism having a sheave with an axially stationary member and an axially movable member, said axially movable member having a fluid pressure operated portion; said position control mechanism comprising: a source of fluid pressure; valve means operatively connected to said source of fluid pressure for controlling the delivery of fluid pressure to said fluid pressure operated portion; reciprocable actuator means for controlling said valve means; resilient means for continuously urging said actuator means in one direction into abutment with said valve means; lever means having spaced ends and connecting means intermediate the ends for operatively connecting said lever means with said actuator means; one of said ends being maintained in contact with said axially movable member by said resilient means; and control means operatively maintained in abutment with the other end of said lever means by said resilient means, said control means being operable to pivot said lever means about said one end when a change in the variable drive mechanism in one direction is desired so that said actuator means will be moved by movable connecting means to permit said valve means to direct fluid pressure to cause a change in the axial position of said axially movable member resulting in pivoting of the lever means about said other end which will permit said resilient means to move the actuator means to discontinue operation of said valve means when the position of the axial movable member desired by the control means is achieved, and said control means being operable to move away from abutment with the other end of said lever means when a change in the variable drive mechanism in another direction is desired so that said resilient means will move said actuator means to actuate said valve means and simultaneously pivot said lever means about said one end to maintain abutment with said control means whereby said valve means will direct fluid to cause a change in the axial position of said axially movable member resulting in pivoting of said lever means about said other end to enforce movement of said actuator means to permit operation of said valve means to discontinue when the position of the axial movable member desired by the control means is achieved.

* * * * *